United States Patent [19]

Foti

[11] 4,165,109
[45] Aug. 21, 1979

[54] WIDE-BAND COMPRESSION COUPLING

[75] Inventor: Sam J. Foti, Lyndhurst, Ohio

[73] Assignee: Federal Hose Manufacturing Corp., Painesville, Ohio

[21] Appl. No.: 866,217

[22] Filed: Jan. 3, 1978

[51] Int. Cl.² .............................................. F16L 21/00
[52] U.S. Cl. .................................. 285/177; 285/369; 285/382; 285/420
[58] Field of Search ...................... 285/417, 419, 382.2, 285/382.1, 177, 382, 420, 369, 373

[56] References Cited

U.S. PATENT DOCUMENTS

| 3,905,623 | 9/1975 | Cassel | 285/417 X |
| 3,944,265 | 3/1976 | Hiemstra et al. | 285/373 X |
| 4,049,298 | 9/1977 | Foti | 285/177 |

Primary Examiner—Thomas F. Callaghan
Attorney, Agent, or Firm—Pearne, Gordon, Sessions

[57] ABSTRACT

A wide-band compression coupling for flexible hose, piping or tubing is disclosed which has a sleeve assembly extending circumferentially around the adjacent ends of the tube or pipe. The sleeve assembly has an axially extending, radially projecting crown with a unique clamping means at the crown to tighten the sleeve assembly around the ends of the tubes or pipes. The clamping means comprises a pair of opposed spacer members extending axially on each side of the crown and a center member within the crown interposed between the spacer members. The center member is adapted to be forced radially outwardly when the spacer members are drawn together by fastener means. As the center member moves radially outwardly, the sleeve assembly crown is pulled with it to tighten the sleeve assembly around the ends of the tubes or pipes. The coupling is capable of joining together tubes or pipes having unequal outer diameters and can accommodate tubes or pipes within a range of outer diameters.

7 Claims, 5 Drawing Figures

WIDE-BAND COMPRESSION COUPLING

BACKGROUND OF THE INVENTION

This invention relates to joints or couplings, and particularly to a wide-band compression coupling such as used to make connections in a diesel truck exhaust system between the engine exhaust pipe and the flexible metal hose exhaust stack.

In many installations of flexible hose, tubing and piping, it is desirable to install a completely sealed clamp-type coupling to join together the ends of the hose, tube or pipe sections, which may be of the same or different diameters. Such a coupling should be strong, easily installed, and removable to facilitate repair and replacement. These couplings usually have a wide annular sleeve assembly extending circumferentially around the end portion of the tubes or pipes. The sleeve assembly is circumferentially extensible so that the diameter of the sleeve assembly can be increased and the coupling loosened when fitting the coupling around the joint. The coupling also usually has clamping means for tightening and compressing the extensible sleeve assembly around the tube or pipe end once the coupling is in place. The compressive force holds the clamp in place and keeps the ends of the tube or pipe section together.

In U.S. Pat. No. 4,049,298, the present inventor has disclosed a compression coupling of this type having a jacket member with an axially extending wrinkle formed therein directly over the gap formed in the circumferentially extensible sleeve. A sealant could be placed within the wrinkle. As the jacket member was tightened by the clamping means, the wrinkle flattened, forcing the sealant down into the gap. The clamping means disclosed in the aforementioned patent comprised a pair of bars, one attached to the jacket member and the other attached to a flange connected to the sleeve. The bars were provided with holes through which bolts were inserted, with nuts threaded along the bolts to provide a suitable fastening means. The circumferential tightening movement or displacement of the jacket member was provided solely by the displacement of the nut along the threaded portion of the bolt. Thus, in order to displace the end of the jacket member a distance of two inches, it was necessary for the nut to travel two inches along the shank of the bolt. Since it is necessary to alternate tightening the two bolts, the clamping means required considerable installation time during which the installer performed the necessary operation to alternatively tighten the bolts.

Another disadvantage with the clamping means of the aforementioned Foti patent was that the bars were relatively unsupported during the clamping operation. Unless both bolts are tightened substantially simultaneously, the bars would tend to bend as a result of the larger compressive force being exerted at one end of the bar than the other. In order to balance the force during the clamping operation, it was necessary to successively alternate between tightening one bolt and the other. This requirement made the clamping operation extremely cumbersome and time-consuming since it was necessary to alternate between the bolts numerous times.

Other clamping means have been disclosed, such as that shown in U.S. Pat. No. 3,905,623 issued to P. R. Cassel. Cassel discloses a wide-band clamp-type coupling for placing around the adjacent ends of tubing having the same outer diameters. The clamping means for this coupling comprises a pair of rounded spacer bars on each side of an inwardly opening radially extending channel formed in the sleeve which extends around the tubing. An anvil-shaped spline is positioned within the channel. As the bolts are tightened, the sleeve conforms to the shape of the spline, thereby drawing the sleeve tighter around the pipe. When the bolts are fully tightened and the sleeve is securely compressed against the spline, the spline forms part of the seal along the tubing connection.

A major disadvantage with the wide-band coupling disclosed in the Cassel patent is that its utility is limited to tubing of a fixed equal outer diameter. The ability to accommodate tubing with a range of outer diameters is important since tubing of a specific size may not always be available. With Cassel's coupling it is not possible to accommodate tubing of various outer diameters within a certain range because the sleeve must be fully tightened in a fixed position to form the seal. If the bolts are not fully tightened, a complete seal is not formed, and after fully tightening the bolts further tightening is impossible because the center spline acts as a stop to limit further motion of the spacer bars.

It is also not possible to use Cassel's wide-band coupling of connections between tubing having unequal outer diameters. The capability of joining ends of tubing having different outer diameters is important, for example, in making the connection between the diesel truck engine exhaust pipe and the flexible metal hose exhaust stack having the same inner diameters, because the flexible metal hose of the same inner diameter as the metal hose is made of a heavier material and has a thicker wall, resulting in a greater outer diameter. To use Cassel's coupling it is necessary to use a flexible hose of a smaller size, resulting in uneven inner diameters. Since standard hose is designated and ordered by its inner diameter measurement a special diameter hose must be used with Cassel's coupling to achieve equal outer diameters between the hose and the pipe.

Another disadvantage with Cassel's coupling is that it cannot be removed simply by loosening the bolts. Once the sleeve has been deformed into the concave sides of the center spline, the sleeve will remain taut around the tubing even after the bolts have been loosened and the spacer bars have been removed. The sleeve cannot be readily deformed back to its original shape. To remove Cassel's coupling, the tubing thus must be burned apart on each side of the coupling. As a result, about 1½ inches of tubing on each side of the coupling will be lost each time the coupling is replaced.

In the aforementioned Cassel patent, a coupling is also disclosed in which the adjacent ends of the tubing are deformed, and one tubing end is inserted inside the other. The clamping means again comprises a pair of rounded spacer bars, and the center spline is provided by an anvil shape in the deformed inner tubing. A center reinforcing member is added to this anvil-shaped portion of the inner tubing. As with Cassel's wide band coupling, this coupling is limited to tubing of a certain outer diameter and will not accommodate a range of outer diameters. Furthermore, this coupling requires special tubing having ends specially deformed to interfit and to accommodate the clamping means.

The capabilities of all of these prior art clamping means was limited because the amount of displacement which could be performed on the sleeve assembly was limited. In the prior Foti patent the displacement was limited by the length of the shank of the bolt which attached the two bars. In the prior Cassel patent the displacement was limited by the amount of deformation performed by the spacer bars which engage the inner spline.

SUMMARY OF THE INVENTION

The disadvantages and problems of the prior art clamping means are overcome by the compression coupling of the present invention.

It is an object of the present invention to provide a wide-band compression coupling for thin-walled pipes or tubes which applies even forces around the circumference of the pipes or tubes being fitted together, and which may be used without deforming the ends of the pipes or tubes.

Another object of the present invention is to provide a wide-band coupling in which the longitudinal seal is not generated by complete deformation of the sleeve, so that the coupling forms a seal before the sleeve is completely deformed and so that the sleeve may be further tightened without encountering a center spline which acts as a stop to limit further tightening of the sleeve, whereby the coupling of the present invention may accommodate tubes or pipes within a range of outer diameters.

Yet another object is to provide a coupling specially adapted for installation around the ends of the tubing or pipes having unequal outer diameters and to thereby avoid the necessity of using special diameter hose or tubing to achieve equal outer diameters.

Still another object is to provide a coupling which can be readily removed without burning off the ends of the tubing.

Another object is to provide a coupling having a clamping means which produces a greater displacement of the sleeve assembly during the clamping operation than heretofore possible.

Yet another object is to provide a coupling having a clamping means which provides better balance during the tightening operation reducing the number of times it is necessary to alternate between tightening the bolts.

Still another object is to provide a clamping means having reinforcement to reduce the tendency of the clamp to bend during the tightening operation and having means to maintain the plane of the clamping means to reduce the circumferential motion during tightening.

Another object is to provide a compression coupling specially adapted for installation in diesel truck exhaust systems to provide a connection with superior sealing capabilities to substantially reduce the environmentally undesirable emissions of exhaust gases and noise.

These and other objects are accomplished by the compression coupling of the present invention which comprises a sleeve assembly extending circumferentially around the end portions of the pipes or tubes. The sleeve assembly has an axially extending, radially projecting crown with clamping means at the crown to tighten the sleeve assembly around the ends of the pipes or tubes. The clamping means includes a pair of opposed spacer members extending axially on each side of the crown and a center member within the crown interposed between the spacer members. The center member is adapted to be forced radially outwardly when the spacer members are moved closer together. Fastener means are provided for drawing the spacer members together to force the block radially outwardly thereby tightening the sleeve around the ends of the pipe or tube. As the fastener means are drawn together, the crown of the sleeve assembly conforms to the interior convex surface of the spacer members and to the outwardly moving center member so that a significantly greater amount of displacement is provided in the crown of the sleeve assembly than was heretofore possible using prior art clamping means. In addition, preferably reinforcing means are provided between the spacer members and the fastener means to maintain the plane of the crown during the tightening, thereby avoiding motion of the clamping means in one direction. By eliminating the center spline and the necessity of using the spline as part of the longitudinal seal, there is no need to produce complete deformation of the jacket member in order to generate the seal, so that the coupling may be advantageously used around pipes or tubes of various outer diameters.

DESCRIPTION OF THE PREFERRED EMBODIMENTS

Figure 1:
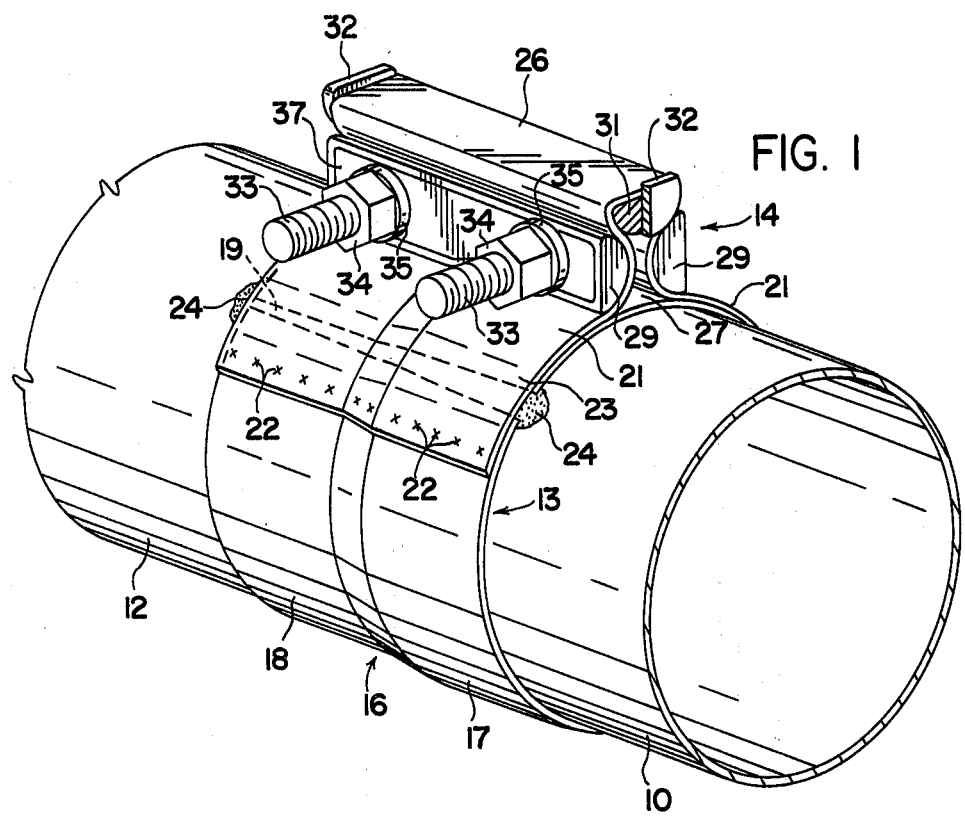
FIG. 1 is a perspective view of the compression coupling of the present invention installed at a pipe or tube fitting and connecting to a flexible metal hose of a larger outer diameter.
Figure 2:
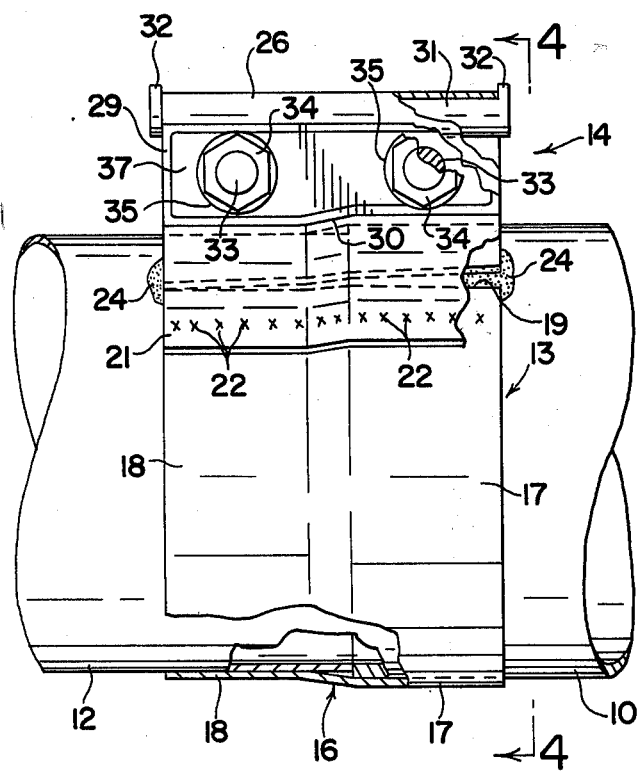
FIG. 2 is a side elevational view of a coupling of FIG. 1.
Figure 3:
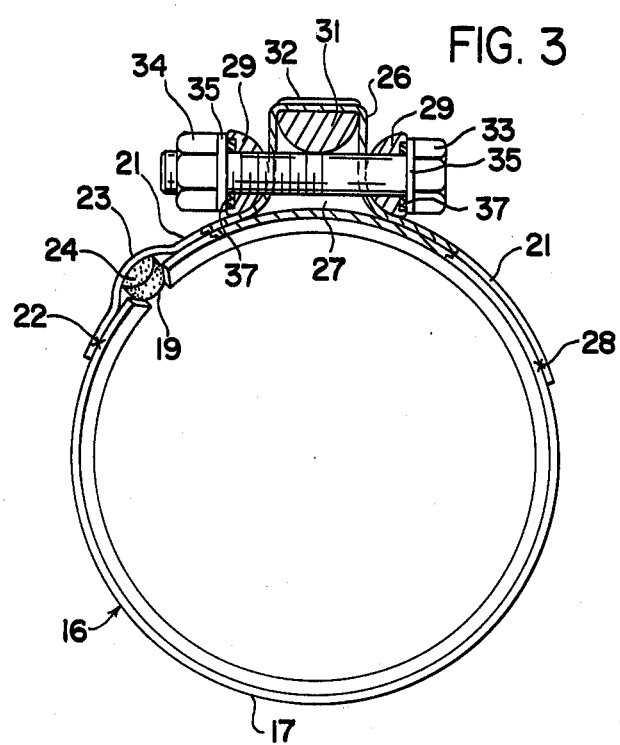
FIG. 3 is a sectional view of the coupling of FIG. 1 prior to installation.
Figure 4:
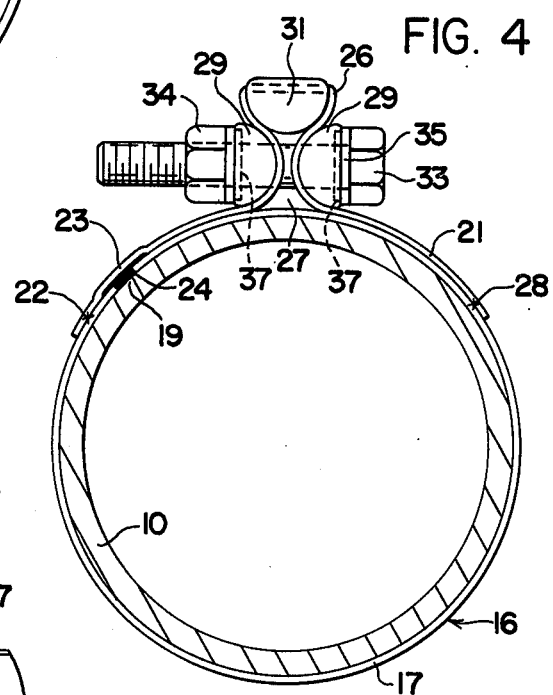
FIG. 4 is a sectional view similar to FIG. 3 showing the coupling after installation, as viewed along line 4—4 of FIG. 2.

Referring more particularly to the drawings and intially to FIGS. 1-4, there is shown a preferred embodiment of the compression coupling of the present invention. In FIGS. 1, 2 and 4, the coupling is shown installed around the adjacent end portion of a flexible metal hose 10 and a slightly smaller diameter pipe or tube 12. The coupling comprises a sleeve assembly 13 which extends circumferentially around the ends of the hose 10 and the tube 12 and a clamping assembly or means 14 for tightly securing the sleeve assembly in a compressive manner around the joint over which the compression coupling is installed.

Although the sleeve assembly 13 may be of any known design, the preferred sleeve assembly is generally of the construction shown in U.S. Pat. No. 4,049,298. The assembly comprises a sleeve 16 which is formed in a wide annular band extending circumferentially around the end of the hose 10 and the tube 12. To accommodate the different outer diameters of the hose 10 and the tube 12, the sleeve 16 has a larger diameter section 17 and a smaller diameter section 18. The sleeve 16 is annularly formed from a flat length of material, and an axially extending gap 19 is formed along the seam where the ends meet. The gap 19 along the sleeve 16 is provided so that the sleeve diameter can be extended when the sleeve is installed over the end of the hose 10 and the tube 12, and so that the coupling can accommodate hoses, tubes and pipes of various diameters. When the gap 19 is widened, as shown in FIG. 3, the sleeve 16 has a larger diameter, enabling the sleeve to be easily fitted over the ends of the tube and hose. When the coupling is installed and the sleeve compressed, as shown in FIG. 4, the gap 19 is narrowed and the sleeve 16 forms a seal at the fitting completely around the ends of the tubes except along the gap 19. The tube 12 preferably extends into the hose the full width of the sleeve 16 to reinforce the larger hose against clamping pressure.

To provide a means for sealing the coupling along the gap 19, the coupling has a jacket member 21. As depicted in FIGS. 1-4, the jacket member 21 is attached at one end to the sleeve 16 on the lower side of the gap 19, preferably by welding 22, and extends upwardly over the gap. Along the line where the jacket member 21 extends over the gap 19, a wrinkle 23 is formed in the jacket member 21 (FIG. 3). The wrinkle 23 resembles an axially extending hump or bulge in the jacket member 21. As hereinafter explained, the wrinkle is adapted to flatten out when the clamping assembly 14 pulls the jacket member 21 taut. Beneath the wrinkle 23 a channel is formed and within this channel an axially extending strip of sealant 24 may be placed directly over the gap 19. The sealant 24 can be made from any suitable gasket material such as red rubber, black neoprene, white neoprene, muffler sealant, asbestos or the like.

Adjacent and parallel to the wrinkle 23, a radially outwardly extending crown 26 is formed along the length of the jacket member 21. As shown in FIG. 3, a channel 27, having a generally rectangular cross section prior to clamping, is formed beneath the crown 26 in the jacket member 21. The jacket member 21 is attached to the sleeve 16 on the side of the crown 26 opposite the gap 19, such as by welding 28. To produce equal clamping forces on each side of the jacket member 21, the crown 26 is formed approximately in the middle of the jacket member so that the lengths of the jacket member between the crown and each welding 22 and 28 are equal.

The clamping asssmbly 14 is positioned at the crown 26 to pull the jacket member 21 so that the sleeve 16 is tightly clamped in a compressive manner around the joint when the coupling is installed. The clamping assembly 14 includes a pair of opposed spacer bars 29, each having facing cross-sectional configurations which are approximately semi-circular. The spacer bars 29 are substantially parallel to the longitudinal axes of the hose, pipe or the like being coupled together. The spacer bars 29 are positioned on each side of the crown 26 with the convex outer surface of each bar located against the radially outwardly extending surface of the crown. To accommodate the different diameter sections 17 and 18 of the sleeve 16 which maintains the spacer bars 29 in proper alignment, the edge of each bar adjacent to the sleeve preferably has a step 30 (FIG. 2) so that one portion of the bar is wider than the other. While the spacer bars 29 may be formed from standard half-round stock, it is preferred that the bars 29 be die cast so that the step 30 may be provided.

A center bar 31 is positioned within the upper portion of the channel 27 between the two spacer bars 29. The bar 31 also has a semi-circular configuration with a substantially flat outer surface having edges which are rounded to prevent undesirable stress concentration along the edges of the crown 26. If desired, the ends of center bar 31 may be provided with ridges or ears 32 designed to accommodate the width of the crown of the jacket member and keep the center bar positioned beneath it. The center bar 31 fits loosely within the channel 27 and extends as one integral piece substantially throughout the length of the jacket member 21.

The sides of the crown 26 are provided with openings for passage of a pair of bolts 33 therethrough with appropriate corresponding openings provided in the spacer bars 29. Nuts 34 fit over the bolts 33 to provide a suitable fastening means, with hardened washers 35 between the outer flat surface of the spacer bars 30 and the bolt head or nut. As shown in FIG. 3, prior to installation, the center bar 31 rests on the shank of the bolts 33 within the line of movement of the curved outer surfaces of the spacer bars 29. The spacer bars 29 and the center bar 31 are dimensioned such that, as the spacer bars are drawn together by the interaction of the bolts 33 and the nuts 34, the center bar 31 is forced radially outwardly by engagement with the curved outer surfaces of the spacer bars (FIG. 4). As the center bar 31 within the crown 26 is forced radially outwardly the crown is pulled with it to clamp and tighten the jacket member 21.

Preferably, reinforcing means comprising a hardened metal insert 37 is provided extending along the flat outer surface of each spacer bar 29. As shown, each insert 37 is positioned in a corresponding recess in the flat outer surface of the spacer bar 30. However, the recesses may be omitted and the inserts may be located extending from the flat outer surfaces of the bars 29. The rigid inserts 37 function to maintain the plane of the spacer bars 30 during the tightening of the bolts 33 and nuts 34 and to prevent bending of the bars 29 as one bolt is tightened more than the other bolt.

Before installation, the coupling resembles the depiction of FIG. 3. The wrinkle 23 is fully formed, the gap 19 is relatively wide, and the spacer bars 29 are spaced apart with the center bar 31 interposed between the spacer bars. The wide opening of the gap 19 gives the sleeve 16 a larger diameter and allows the sleeve to easily fit over the ends of the tubes. After the coupling has been fitted in its desired position, the nuts 34 are tightened along the bolts 33, drawing the spacer bars 29 together. The two bolts 33 are tightened alternatively until sufficient tightening has been achieved. While it is necessary to alternate tightening between the two bolts, substantially greater tightening can be placed on each bolt before the other bolt need be tightened than was heretofore possible with the clamping means of the aforementioned U.S. Pat. No. 4,049,298, due to the rigidity of the spacer bars 29 and the presence of the inserts 37. The inserts 37 also assist in maintaining the plane of the spacer bars 30 during the tightening operation. Prior to tightening, the loose spacer bars 29 are capable of moving radially upwardly and downwardly as well as circumferentially along the shank of the bolts 33. The rigid inserts 37 restrict the circumferential movement of the spacer bar 29, so as to facilitate tightening the bars.

As the spacer bars 29 are drawn together, the center bar 31 is forced radially outwardly by engagement with the rounded outer surfaces of the spacer bars 29. The radially outward movement of the center bar 31 forces the outer portion of the crown 26 with it. At the same time, the converging spacer bars 29 force the sides of the crown 26 into the channel 27 until it resembles an hourglass shape. The jacket member 21 is thus pulled taut, and the wrinkle 23 flattens out and conforms to the circumference of the annular sleeve 16, and the sealant 24 is pressed into the gap 19. Since there are equal lengths of the jacket member 21 extending from each side of the crown 26, the jacket member is pulled equally tight between the crown and each of the weldings 22 and 28. When the coupling is tightened, it resembles that shown in FIGS. 1, 2, and 4, with the sleeve 16 fitting tightly around the ends of the hose 10 and the tube 12. Since the wrinkle 23 in the jacket member 21 forms a seal across the gap 19, the coupling produces a complete longitudinal seal without complete deformation of the crown 26 by the converging spacer bars 29, so that the same coupling can also be used with hoses, pipes or tubes having a somewhat larger outer diameter. Moreover, while it is possible to draw the spacer bars 29 together until the sides of the crown 26 are contiguous, the coupling will preferably be tightened before the spacer bars 29 meet, so that the bars may be moved closer together to accommodate hoses, pipes or tubes which might have a somewhat smaller outer diameter. This design contrasts from prior art designs having a center spline positioned within the channel against which the jacket member must be secured to produce a longitudinal seal and which prevents any further movement of the spacer bars, whereby the utility of the coupling is limited to hoses of a fixed outside diameter.

In the event of repair or replacement, the coupling can be easily removed without resorting to burning off the end of the tube 12. The bolts 33 are loosened until the spacer bars 29 are adequately loosened from the deformed sides of the crown 26. After the spacer bars 29 have been loosened, the top of the crown 26 is hammered to force the center bar 31 radially inwardly. This deformation of the crown 26 slackens the jacket member 21, permitting removal of the coupling. It is noted that this removal procedure was not possible with prior art couplings having a center spline.

Figure 5:
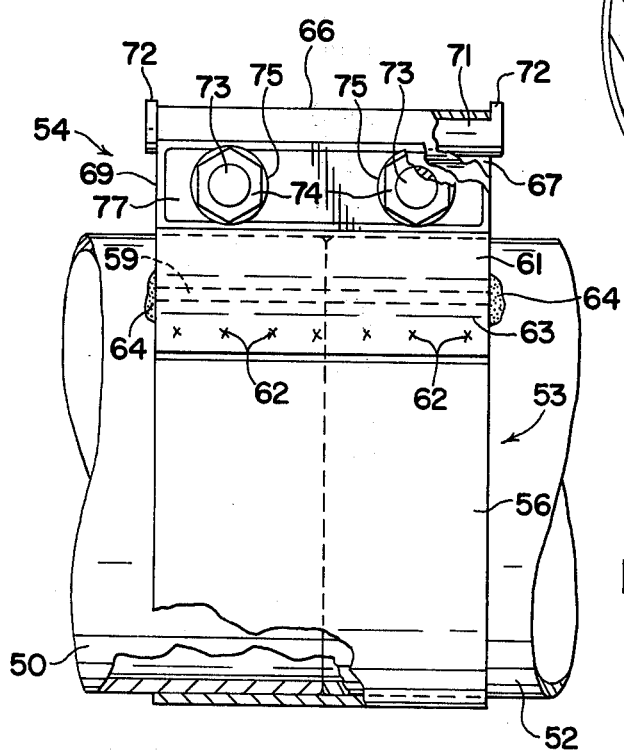
FIG. 5 is a side elevational view similar to FIG. 2 showing another embodiment of the present invention connecting pipe or tube fittings of the same diameter.

An alternative embodiment of the coupling of the present invention is shown in FIG. 5. This coupling is essentially the same as that already described, except that it is suitable for installation around the adjacent ends of two lengths of piping or tubing having approximately the same outer diameter, such as tube 50 and hose 52. This embodiment also has a sleeve assembly 53 and a clamping assembly 54 which is essentially identical to that already described. The sleeve assembly 53 has a circumferentially extending sleeve 56 with an axial gap 59 formed in the sleeve. A jacket member 61 is attached to the sleeve 56 on one side by welding 62 and extends over the gap with a wrinkle 63 formed directly over the gap 59. Beneath the wrinkle 63, a strip of sealant 64 may be provided. The jacket member 61 also has an axially extending crown 66 with a channel 67 formed within the crown. The end of the jacket member 61 on the other side of the crown 66 is attached to the sleeve 56 as before. The clamping means 54 is located adjacent to the crown 66 and comprises a pair of opposed spacer bars 69 on each side of the crown with a center bar 71 having ears 72 interposed between the spacer bars 69 within the channel of the crown. Since the coupling is used with pipe or tube of equal outer diameters, the spacer bars 69 have a straight bottom edge and do not have a step corresponding to the step 30. The spacer bars 69 are drawn together by a pair of bolts 73 having corresponding nuts 74 and washers 75. If desired, washer means such as metal inserts 77 may be provided. The installation of the coupling of FIG. 5 is performed in the same manner as the installation of the coupling of FIGS. 1-4, already described.

Various modifications or changes may be incorporated in the designs disclosed. For example, the coupling of FIGS. 1-4 may also include a wrinkle between the crown 26 and the welding 28, similar to and spaced symmetrically with respect to the wrinkle 23. This additional wrinkle would assure that equal clamping forces are produced on each side of the jacket member 21 and would provide an additional visual indication of the degree to which the clamping assembly 14 has been tightened.

While the invention has been shown and described with respect to specific embodiment thereof, this is intended for the purpose of illustration rather than limitation. Other modifications and variations in the specific article shown herein and described will be apparent to those skilled in the art, all within the intended scope and spirit of the invention. Accordingly, the invention is not to be limited to the specific embodiments herein shown and described nor in any other way that is inconsistent with the extent to which progress in the art has been advanced by the invention.

What is claimed is:

1. A compression coupling for fitting around cylindrical objects, which comprises:
    a sleeve assembly extending circumferentially around the cylindrical objects, the assembly having a crown projecting radially outwardly and extending parallel to the longitudinal axis, a channel being formed within the crown;
    clamping means at the crown to tighten the sleeve assembly around the cylindrical objects, the clamping means comprising:
    a pair of opposed spacer members extending axially on each side of the crown, each of the spacer members having an inner camming surface,
    a center member within the channel of the crown interposed between the spacer members, the center member having a camming surface, the center member adapted to be forced radially outwardly by indirect engagement of the camming surface of the center member by the camming surfaces of the spacer members when the spacer members are drawn together, and
    fastener means inserted through the spacer members and the crown and positioned radially inwardly of the center member for drawing the spacer members together and for forcing the center members radially outwardly to tighten the sleeve around the cylindrical objects.

2. A compression coupling according to claim 1 wherein the center member is an elongated rod having a generally flat outer surface with a cross section which is generally semicircular.

3. A compression coupling according to claim 1 wherein each of the spacer members is an elongated rod having a cross section which is generally semi-circular.

4. A compression coupling according to claim 1 comprising in addition a pair of elongated reinforcing means, each reinforcing means located between one of the spacer members and the fastener means to maintain the plane of the coupling as the spacer members are drawn together.

5. A compression coupling according to claim 1 in which the sleeve assembly has a larger diameter portion and a smaller portion for fitting around cylindrical objects of different diameters.

6. A compression coupling according to claim 5 in which each of the spacer members has a step in the edge adjacent to the sleeve assembly to maintain the spacer members in alignment while accommodating the larger and smaller diameter portions of the sleeve assembly.

7. A compression coupling according to claim 1 wherein the sleeve assembly comprises:
 a circumferentially extensible annular sleeve for extending around the cylindrical object and having a gap therein extending parallel to the longitudinal axis; and
 a relatively thin jacket member attached at one end to the sleeve and extending over the gap and having an axially extending crown therein, the other end of the jacket member attached to the sleeve on the side opposite the crown.

* * * * *